United States Patent
Badovinac et al.

(10) Patent No.: US 7,536,653 B2
(45) Date of Patent: May 19, 2009

(54) SELECTION MECHANISM IN A PORTABLE TERMINAL

(75) Inventors: Jan M. Badovinac, Toronto (CA); Estella Stok, Eindohoven (NL)

(73) Assignee: OCE-Technologies B.V., Venlo (NL)

( * ) Notice: Subject to any disclaimer, the term of this patent is extended or adjusted under 35 U.S.C. 154(b) by 516 days.

(21) Appl. No.: 10/682,036

(22) Filed: Oct. 10, 2003

(65) Prior Publication Data
US 2004/0076444 A1   Apr. 22, 2004

(30) Foreign Application Priority Data
Oct. 14, 2002   (EP)   ................................ 2079456

(51) Int. Cl.
*G06F 3/048* (2006.01)
(52) U.S. Cl. ...................... 715/810; 715/828; 715/830; 715/864
(58) Field of Classification Search ................. 715/833, 715/830, 829, 810, 853, 864; 399/81, 8; 455/564, 566, 575, 158.1, 351; 273/148; 364/550
See application file for complete search history.

(56) References Cited

U.S. PATENT DOCUMENTS

| | | | | |
|---|---|---|---|---|
| 5,563,631 A * | 10/1996 | Masunaga | ................... | 345/169 |
| 5,701,548 A | 12/1997 | Okatani | | |
| 5,822,221 A * | 10/1998 | Groenteman | ................ | 702/188 |
| 5,856,827 A * | 1/1999 | Sudo | .......................... | 715/841 |
| 5,883,619 A | 3/1999 | Ho et al. | | |
| 5,915,228 A * | 6/1999 | Kunihiro et al. | ......... | 455/575.1 |
| 5,958,012 A * | 9/1999 | Battat et al. | ................. | 709/224 |
| 5,987,336 A * | 11/1999 | Sudo et al. | .................. | 455/566 |
| 5,999,827 A * | 12/1999 | Sudo et al. | .................. | 455/564 |
| 6,201,524 B1 * | 3/2001 | Aizawa | ....................... | 345/684 |
| 6,275,225 B1 * | 8/2001 | Rangarajan et al. | ......... | 715/700 |
| 6,304,674 B1 * | 10/2001 | Cass et al. | ................... | 382/224 |
| 6,338,258 B1 * | 1/2002 | Lee et al. | ....................... | 62/310 |
| 6,392,640 B1 * | 5/2002 | Will | ........................... | 345/184 |
| 6,396,482 B1 * | 5/2002 | Griffin et al. | ................. | 345/169 |
| 6,489,950 B1 * | 12/2002 | Griffin et al. | ................. | 345/168 |
| 6,512,449 B1 * | 1/2003 | Aizawa | ...................... | 340/7.55 |
| 6,885,378 B1 * | 4/2005 | Machida | ..................... | 715/736 |
| 6,885,387 B1 * | 4/2005 | Machida | ..................... | 715/736 |
| 7,093,201 B2 * | 8/2006 | Duarte | ........................ | 715/853 |
| 7,143,355 B2 * | 11/2006 | Yamaguchi et al. | ......... | 715/733 |
| 7,170,392 B2 * | 1/2007 | Hasegawa | .................. | 340/7.55 |

(Continued)

FOREIGN PATENT DOCUMENTS

EP   0 498 082 A1   8/1992

(Continued)

*Primary Examiner*—Weilun Lo
*Assistant Examiner*—Nicholas Augustine
(74) *Attorney, Agent, or Firm*—Birch, Stewart, Kolasch & Birch, LLP (57) ABSTRACT

A portable terminal for presenting status data of a plurality of devices in a proximate environment, wherein the portable terminal includes a display for displaying operating status data of anyone of the devices and a means for selecting anyone of these devices. The portable terminal contains an array of objects representing individual devices being at least partially displayed on the display and movable along a marker, or vice versa, in response to an operator actuating an operating element. The display image is so configured that the array of objects or the marker appears to be an integral part of the operating element.

20 Claims, 9 Drawing Sheets

U.S. PATENT DOCUMENTS

| | | | |
|---|---|---|---|
| 2001/0020892 A1* | 9/2001 | Helferich | 340/7.3 |
| 2002/0130896 A1* | 9/2002 | Spence et al. | 345/716 |
| 2002/0149567 A1* | 10/2002 | Griffin et al. | 345/169 |
| 2002/0171670 A1* | 11/2002 | Clemock et al. | 345/629 |
| 2004/0076444 A1* | 4/2004 | Badovinac et al. | 399/81 |
| 2004/0198249 A1* | 10/2004 | Griffin | 455/90.3 |
| 2004/0228639 A1* | 11/2004 | Badovinac et al. | 399/8 |
| 2006/0082558 A1* | 4/2006 | Chen et al. | 345/184 |
| 2006/0183477 A1* | 8/2006 | Bocking et al. | 455/435.2 |

FOREIGN PATENT DOCUMENTS

| | | |
|---|---|---|
| EP | 1 028 572 A1 | 8/2000 |
| JP | 10-307785 A | 11/1998 |
| JP | 2002-207561 A | 7/2002 |
| WO | WO 02/39712 A2 | 10/2001 |

* cited by examiner

"PRINTER 2" HAS BEEN SELECTED

"STATUS DETAILS" HAS BEEN SELECTED

FIG. 3.3

"QUEUED JOBS" HAS BEEN SELECTED

FIG. 3.4

LIST HAS BEEN SCROLLED

FIG. 3.5

"COPIER 1" HAS BEEN SELECTED

FIG. 3.6

ERROR HAS OCCURRED

FIG. 3.7

"DETAILS" HAS BEEN SELECTED

FIG. 3.8

"INSTRUCTIONS" HAS BEEN SELECTED

FIG. 3.9

"POSTPONE" HAS BEEN SELECTED AND CONFIRMED

SELECTION MECHANISM IN A PORTABLE TERMINAL

BACKGROUND OF THE INVENTION

This non-provisional application claims priority under 35 U.S.C. § 119(a) on patent application Ser. No. 02079456.6 filed in Europe on Oct. 14, 2002, which is herein incorporated by reference.

1. Field of the Invention

The present invention relates to presenting information regarding a plurality of devices in a proximate environment, such as for monitoring the operating status of a plurality of image processing devices located in a reprographic department, and more particularly to a portable terminal for presenting such information to an operator.

In a central reprographics department it is very important that the image processing devices will continue to operate. Paper jams, print jobs which need special inserts, empty paper trays and full finishers are examples of operating states in which the image processing device will stop operating and operator interaction is immediately required. However, the operator could be out of reach of the image processing device's audible or visible clues, or could be away from a central base processor.

There is therefore a need for a portable terminal for monitoring the image processing devices.

2. Background Art

U.S. Pat. No. 5,701,548 discloses a copying system wherein operation modes of a copying machine are set using an IC card located at a distance from the copying machine. The IC card has: a transmitter for transmitting a signal that contains an identification code for identifying the IC card itself, an identification code for identifying a specific copying machine, and prestored operation mode setting information for the copying machine; a receiver for receiving a signal transmitted from the copying machine; a CPU for identifying the copying machine and its operating condition; and a display. The copying machine has a transmitter for transmitting a signal that contains an identification code for identifying the copying machine itself, an identification code for identifying the IC card, and information concerning the operating condition of the copying machine itself; a receiver for receiving a signal transmitted from the IC card; and a CPU for identifying the originating IC card and for setting the copying machine operation mode. When the IC card comes within a short distance from the specific copier, the copier takes on the operating mode stored in the IC card and transmits its operating condition to the IC card, which displays it.

In this known system, the IC card can be used for monitoring a specific copier, but it is only operational during the processing of reproduction jobs that have been started under its control. It does not give information on other devices, or even on the specific device for which it is programmed, when another operator has started a job on that device.

There is therefore a need for a portable terminal that is able to present information regarding a plurality of devices. However, since such a portable terminal must be small to be handled easily, it cannot display all this information at once, and, moreover, such information would be too much for an operator to maintain an overview.

As a solution for this problem, a copending patent application of the present applicant proposes to provide a portable terminal that can, at the selection of an operator, present a general system status overview, or a status report of one selected device.

In the present patent application there is proposed a selection means for selecting any of the devices to be monitored, with the aim of providing intuitively, operable selection elements that can be handled by any operator without specific training.

European Patent Application No. 0 498 082 discloses a selection mechanism for use in a PC, that is adapted to natural movements of an operator and is therefore easy to operate. A menu of selection options is displayed on the PC display screen, the options being placed in a curved band around a circular or kidney-shaped selection window. The inner part of the selection window contains further selection options.

This mechanism, however, still makes use of physically disconnected selection means, such as a display monitor and a digitizer tablet with a co-operating stylus, such that the operator still has to coordinate a hand movement at one place and a display image at a different place. Also, this mechanism is not suitable for a small portable terminal.

WO 02/39712 discloses a device for controlling a menu on a display wherein the menu is arranged as a plurality of simultaneously displayed menu items in a loop and a selector for selecting a menu item, the loop and the selector being movable with respect to each other. The user input device for controlling the selection has a loop configuration and a movement around the loop causes a corresponding relative movement between the selector and the loop of the menu. Although a better solution than that of EP 0 498 082, the two loop movements are still physically disconnected with all drawbacks thereof.

SUMMARY OF THE INVENTION

On this background, it is an object of the present invention to provide a portable terminal for presenting information regarding a plurality of devices in a proximate environment, with an improved user interface. This object is achieved by providing a portable terminal having a digital processor and related memory, a movable operating element, a display for selectively displaying information data of a selected one of said devices, and means for selecting any one of said devices, wherein said selecting means comprises an array of display objects representing individual devices, the array being at least partially displayed on the display, and a marker displayed on said display, said array being movable along the marker or vice versa, wherein the movement of the array or marker is substantially coinciding with the movement of the movable operating element, and the movable operating element is so located that it perceptually at least partially overlaps with the display such that the array or the marker appears to be part of the operating element.

By providing an array of display objects representing individual devices that is movable along a marker, or vice versa, the operator can select in an ergonomic manner the device of which the operating status data is to be displayed, while the internal electronics give the operator the feeling that he is physically "in touch" with the selection images on the display. In other words, the operator is given the feeling that the operating element that he is moving is in some way or other mechanically connected to the display elements.

An additional advantage of the combination of a mechanical operating element and electronically generated display elements, over an entirely mechanical selection element, such as for instance a rotary switch with printed captions, is that display elements can easily be added or removed by reprogramming the processor.

The movable element can be a slide switch and the array would thus be substantially linear. Alternatively, the movable element is a rotary ring and the array is circular or at least arc-shaped. The movable element is preferably provided with a number of arresting positions, whereby the position of one of the objects of the array coincides with the marker at one of the arresting positions.

The rotary ring can be a thumbwheel that protrudes from two side surfaces of the portable terminal, e.g. from two opposing side surfaces of the portable terminal.

The operating element may be used for a dual purpose, where a movement of the movable operating element in a first state of the portable terminal scrolls the array of objects, and movement of the movable operating element in a second state of the portable terminal scrolls an array of menu items. The state may in that case be selected by actuating an internal switch.

Further objects, features, advantages and properties of the portable terminal for monitoring the operating status of a plurality of image processing devices located in a proximate environment according to the present invention will become apparent from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3.1 to FIG. 3.12 show the content of display on the portable terminal in different statuses of the display;

DETAILED DESCRIPTION OF THE INVENTION

The general term "image processing device" as used here includes printers, plotters, scanners, copiers, fax machines online finishers, off-line finishers and combinations or variations thereof, i.e. "image processing" also includes merely handling documents on sheets of paper.

Figure 1:
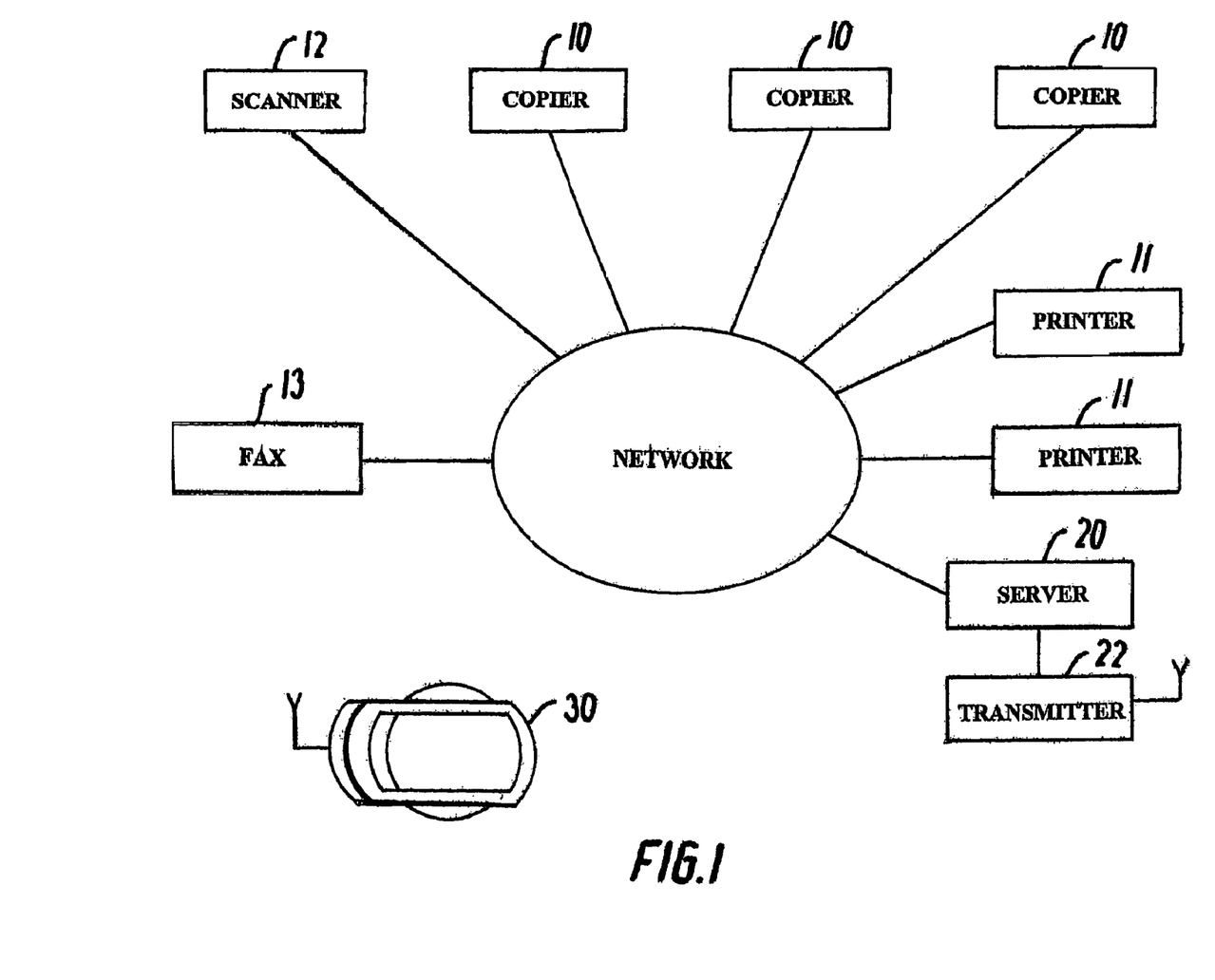
FIG. 1 is a diagrammatic representation of a system for controlling the operating status of a plurality of image processing devices.

With reference to FIG. 1, a plurality of image processing devices in a centralized reprographic department is shown. In this embodiment, three copiers 10, two printers 11, one scanner 12 and one fax 13 are all connected to a local area network. Each of These devices is capable of transmitting their operating status via a network card to an address in the network. A server 20 in the form of a PC is connected to the network and a wireless transmitter 22. The image processing devices 10,11,12,13 send their operating status to the server at regular intervals, either on their own initiative or upon being polled, and without delay in the case of an error. The server processes the status information into an appropriate code for wireless transmission that includes information uniquely identifying the image processing devices 10,11,12,13. The transmitter 22 may be a radio frequency (RF) transmitter using a low intensity signal, such as in accordance with a BLUETOOTH® standard. Alternatively, the transmitter may use more intensive RF signals such as defined in the IEEE 802.11a or IEEE 802.11b wireless LAN standard.

The transmitter 22 may alternatively be of the type that sends infrared (IR) signals incorporating the operating status data. Preferably, the IrDA standard is used for the IR signals.

The image devices are thus all in a proximate environment, i.e. in an environment such as a centralized reprographic department, in which a plurality of these type of devices are located within one building or within one building complex. The image processing devices could all be located in one single room, but they could also be spread over several rooms, floors or wings of a building or building complex.

A portable terminal 30 receives the signals sent by the transmitter 22 and is used to present the operating status data of the different image processing devices to a freely moving operator. The portable terminal 30 is provided with a memory that is preferably of a permanent nature, and registers each of the image processing devices in its proximate environment by storing registration data for each of the image processing devices.

Figure 2:
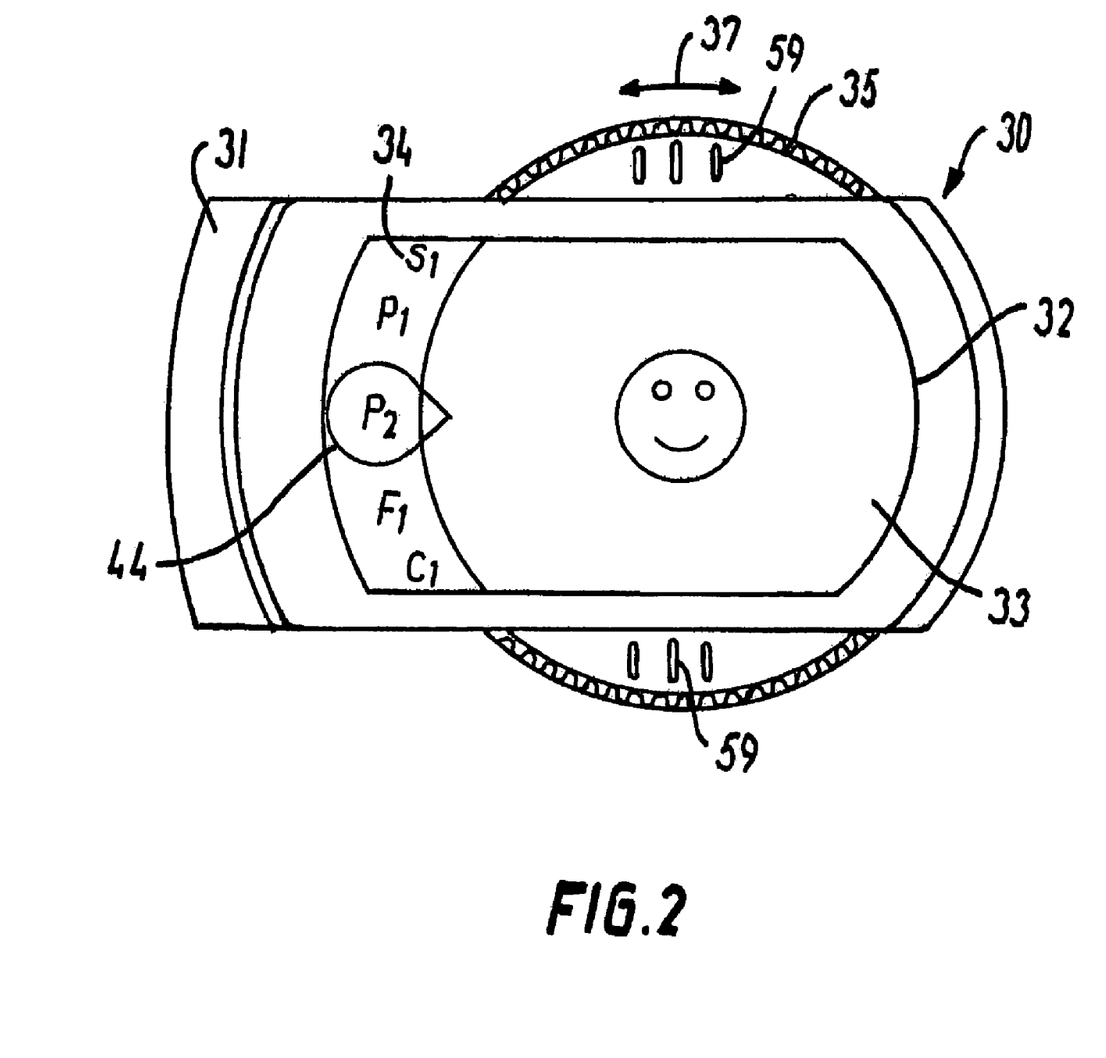
FIG. 2 is a detailed view on a portable terminal in a first preferred embodiment according to the present invention.
Figure 2A:
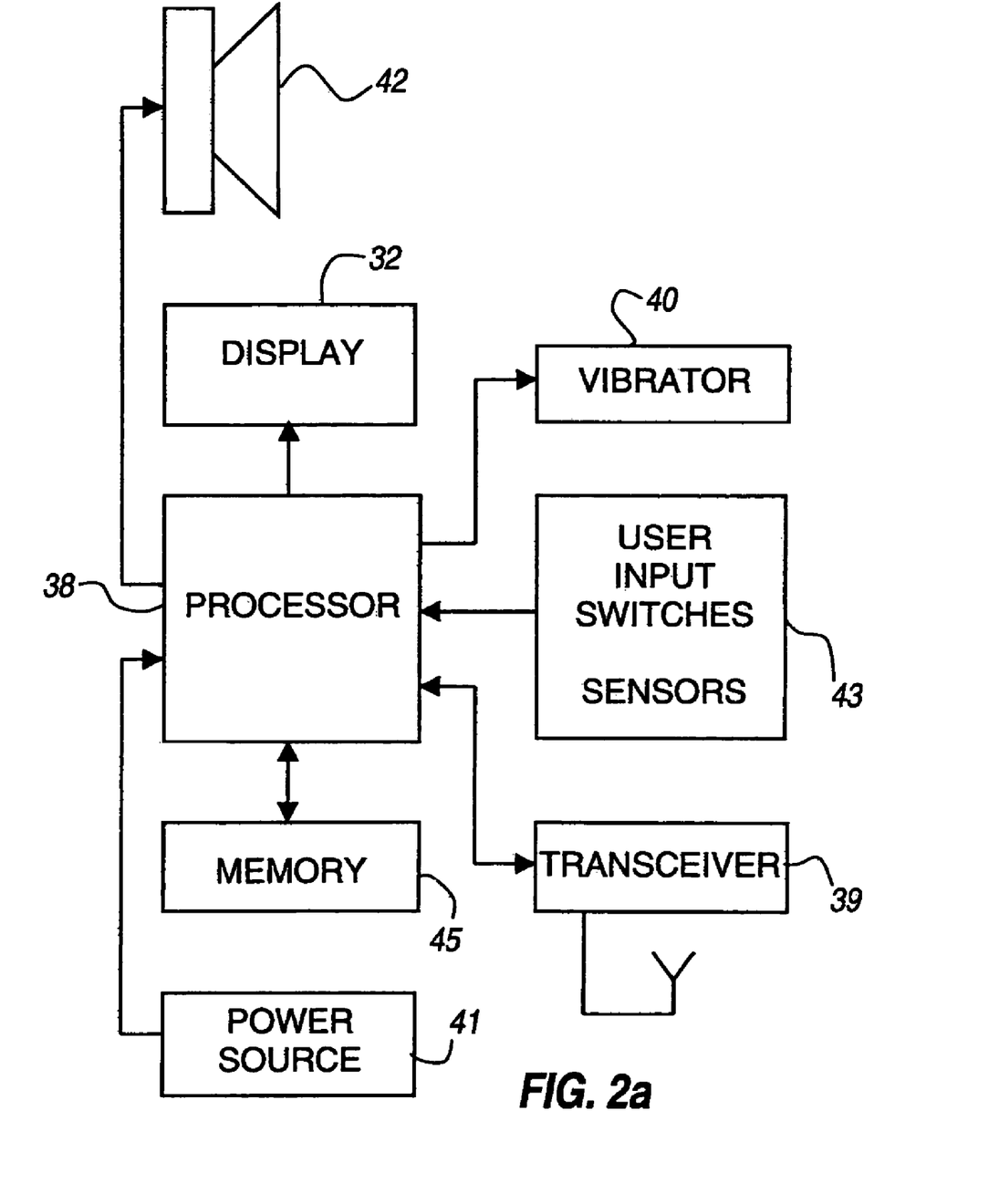
FIG. 2a is a diagrammatic representation of the electronic components of the portable terminal.

With reference to FIG. 2, according to a first preferred embodiment the portable terminal 30 comprises a housing 31, which is provided with a display 32 and a rotary ring 35. The display is a color display capable of showing text and graphical objects. Further, with reference to FIG. 2a a processor 38, a memory 45, a loudspeaker 42 arranged under slots 59 for producing audible alerts and a vibrator 40 for producing vibration alerts are provided. The terminal also comprises a transceiver 39 of a type that matches the respective type of transmitter described above, i.e. an RF or IR transceiver. Power is supplied by a power source 41 in the form of rechargeable batteries, preferably provided with an induction charger (not shown). A block 43, representing the switches and sensors for user input is like the other electronic components 32,39,40,41 and 42 connected to processor 38 that controls the operation of the portable terminal 30.

The display 32 includes in two sections:
section 34 is used to display an arc-shaped array of objects representing individual image processing devices, preferably in the form of graphical icons,
section 33 is used for displaying status and menu information.

Figure 2B:
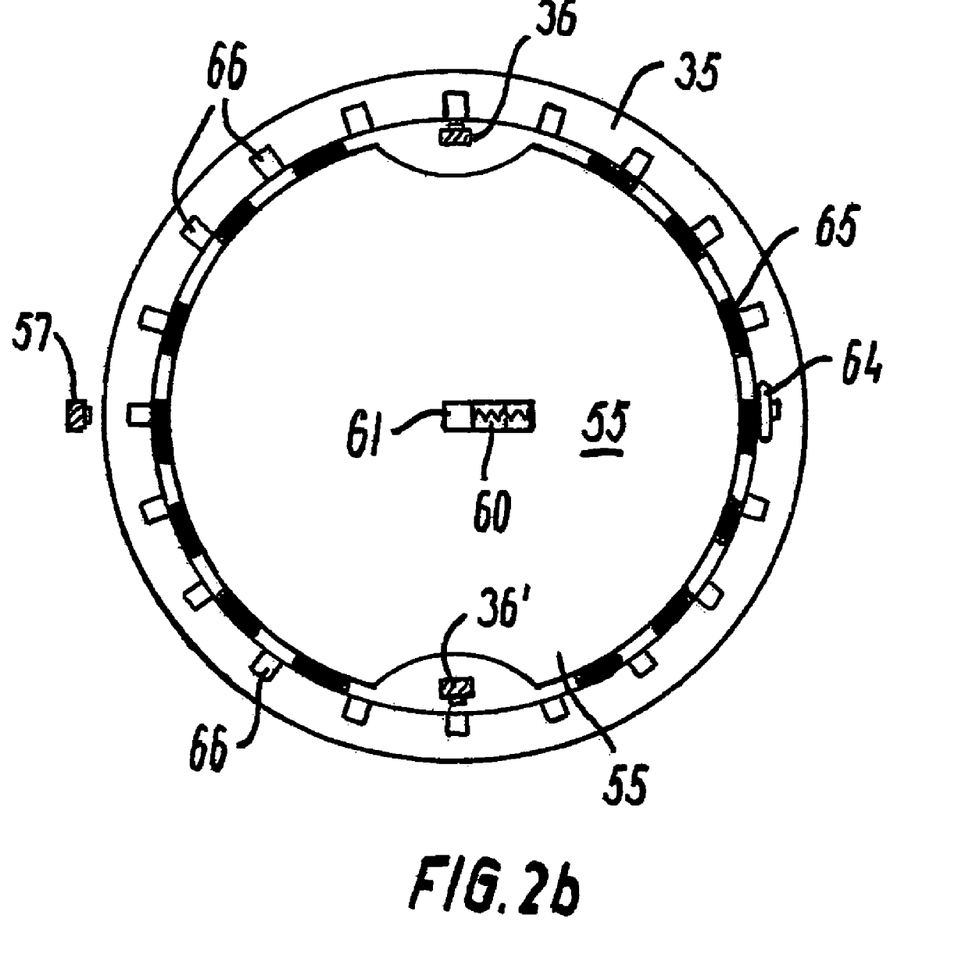
FIG. 2b, is a cut away view on the rotary ring and associated bearing and switches.

The rotary ring 35 protrudes from both side surfaces of the housing 31 and is made of an elastically deformable material. As best shown in FIG. 2b, the rotary ring is guided by a disk 55 provided with circumferentially spaced bearing blocks 65 made of a how friction material such a nylon or teflon, or other suitable guiding elements. The disk is slidably guided by a slit 60 that engages a pin 61 connected to the frame of the portable terminal. This construction allows The operator to slide the rotary ring sideways towards a switch 57 to actuate The latter. A spring located in the slit 60 urges the disk 55 away from the switch 57.

Figure 2C:
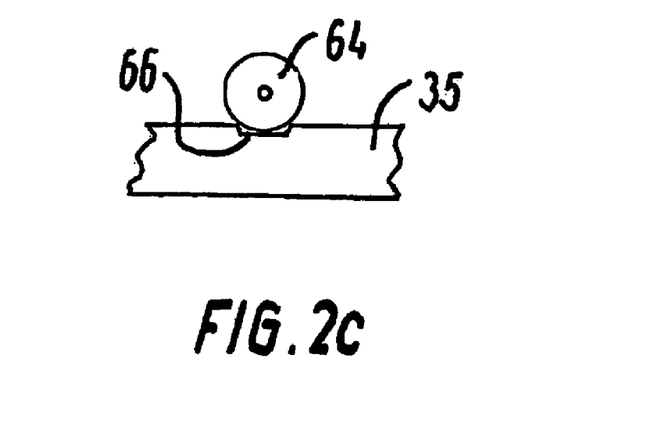
FIG. 2c, shows a detail of a wheel used to pick up angular movements of the rotary disk.

As best shown in FIG. 2c, a wheel 64 connected to an angular displacement detector (not shown) is arranged to be in frictional contact with the side surface of the rotary ring 35. The wheel 64 rotates, be it a factor faster, when the rotary ring is turned. The signal of the angular displacement sensor is sent to the processor 38. The side surface of the ring is provided with recesses 66 that form arresting positions for the rotary ring 35.

A first pressure switch 36 is located in a recess of disk 55 close to the radially inner surface of the rotary ring 35 on one side of the portable terminal. A second pressure switch 36' is located in a recess of disk 55 close to the radially inner surface of the rotary ring 35 on the opposite side of the portable terminal. When an operator presses on the ring at the position of a switch 36, 36', it deforms and the corresponding switch is activated.

In this way, the rotary ring 35 functions as a plurality of buttons for operator interaction with the portable terminal 30.

Figure 6:
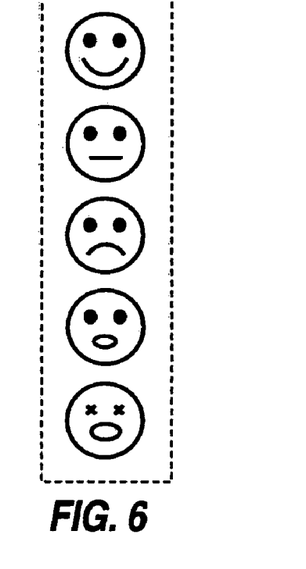
FIG. 6 shows examples of status-describing icons ("smileys").
Figure 31:
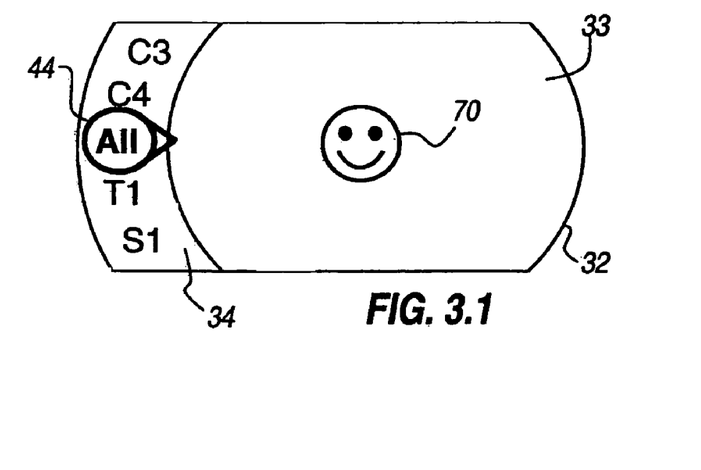

Pressing both "button" sections of the rotary ring 35 for a longer period, preferably longer than 1.5 seconds, is interpreted as a command to switch the terminal on and off. After turning the portable terminal on, the display is activated and takes the state as shown in FIG. 3.1, with an array or list of graphical icons representing image processing devices displayed in a scrollable format in section 34 and general information displayed in section 33, normally showing an icon indicating that all image processing devices are functioning properly in the form of a glyph, such as a happy blue smiley 70. When errors or disturbances have occurred, a smiley with a less happy expression and a changed color (red) is displayed. Matters needing attention at some point, but which do not require immediate attention are indicated by a green smiley with the appropriate facial expression, i.e. sad (miserable) or screaming for attention. Examples of such expressions are shown in FIG. 6.

By turning the rotary ring 35, the operator can scroll through lists or other arrays. Pressing a single button at a time, i.e. one of the side sections of the rotary ring, selects a highlighted or marked item. Depressing the side sections simultaneously for a short period, i.e. less than 1 second, serves to return to the previous state or screen.

Figure 5:
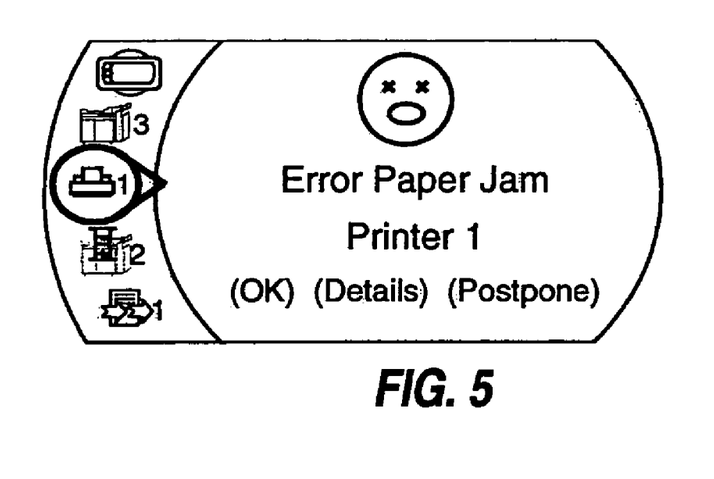
FIG. 5 shows a display that uses graphical icons.

In the display section 34, an array of icons is displayed, forming in this example a list of the image processing devices for which the status is monitored: Terminal (T1), Scanners (S1, S2), Printers (P1, P2), Faxes (F1), Copiers (C1, C2, C3, C4) and the total system (All). T1 is the portable terminal 30 itself. Thus, a different graphical icon is assigned to each image processing device, the total system and the portable terminal itself. The icons may have the form of acronyms (such as shown in FIG. 3.1), but may also have a graphical appearance resembling the particular device, as is shown in FIG. 5.

A static marker is provided on in the form of a selection loop 44, indicating the currently selected device. By sliding the rotary ring 35 sidewards, thereby actuating the switch 57, the array of icons is activated. Once activated, the array of icons can be scrolled by turning the rotary ring 35.

The software controlling the user interface is programmed to scroll the array of icons in the same direction as the rotary ring 35. The software may also be programmed such that the movement of the array of icons is proportional to the movement of the rotary ring 35. Preferably, the software is programmed such that the movement of the array of icons coincides with the movement of the rotary ring 35 in a manner that gives the operator the impression that the array of icons is mechanically connected to the rotary ring 35 because they move in unison.

Figure 32:
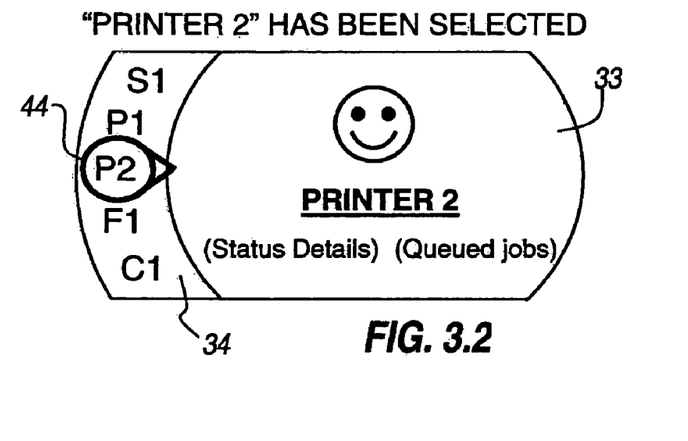

When the operator has scrolled the array so that the appropriate graphical icon is located in the loop 44, displaying the status of the corresponding device is selected by pressing any of the "button" sections of the rotary ring 35, upon which the display 32 turns to the state as shown in FIG. 3.2. In this example, Printer 2 has been selected.

The upper part of section 33 of the display 32 shows a happy smiley since the selected device is functioning properly. Below the smiley, the text "Printer 2" is displayed.

In the bottom part of section 33 the selectable menu items "Status Details" and "Queued jobs" are displayed. One of the selectable items is highlighted, e.g. by using a different color for the selected item or by underlining. Turning the rotary ring 35 scrolls through the "list" of selectable menu items. The highlighted menu item is selected by pressing any of the "button" sections of the ring.

Figure 33:
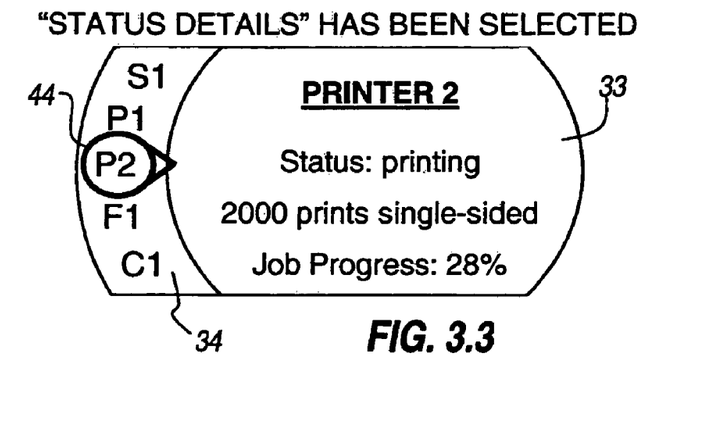

When "Status Details" is selected in the state as shown in FIG. 3.2, the display 32 turns to the state as shown in FIG. 3.3. The upper part of section 33 displays the text "Printer 2". Below this text a list with status information is displayed, in this example:

Status: Printing
2000 Prints Single Sided
Job Progress: 28%

Figure 35:
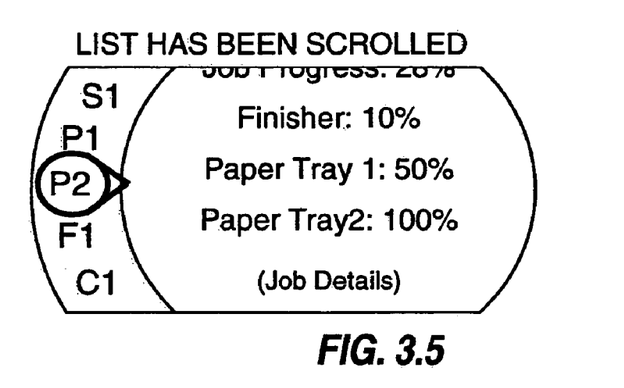

Since the list of information items is too long to be completely shown on the display, further items can be "scrolled" into the display area by turning the rotary ring 35 without displacing it in the way that it would activate switch 57 (FIG. 2b). FIG. 3.5 shows the display screen after such scrolling. In the given example, it now reads:

Job Progress: 28%
Finisher: 10%
Paper Tray 1: 50%
Paper Tray 2: 100%

Figure 34:
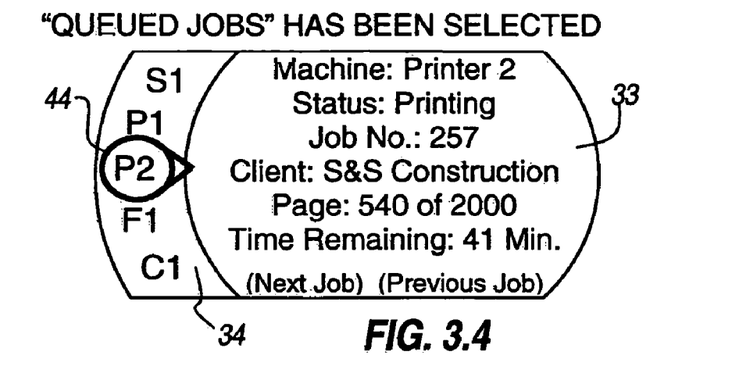

The bottom of display section 33 shows the selectable menu item "Job Details", which brings the display to the status shown in FIG. 3.4. This display status can also be reached by selecting the menu item "Queued Jobs" in the display status shown in FIG. 3.2.

Shortly pressing both "button" sections of the rotary ring 35 at the same time brings the display to the status as shown in FIG. 3.2. Once again pressing both sections brings the display in the state as shown in FIG. 3.1.

In the display status as shown in FIG. 3.4, Section 33 lists the details of the current job such as: "Machine", "Status", "Job Nr.", "Client", "Page", and "Time remaining". In the bottom part of section 33 the selectable menu items "Next job" and "Previous job" are shown. Selecting "Next job" will display the details of the next job in the print queue, just as selecting "Previous job" will display the details of the job last finished. Again, pressing both "button" sections of the rotary ring 35 at the same time will bring the display in the status as shown in FIG. 3.2.

Figure 36:
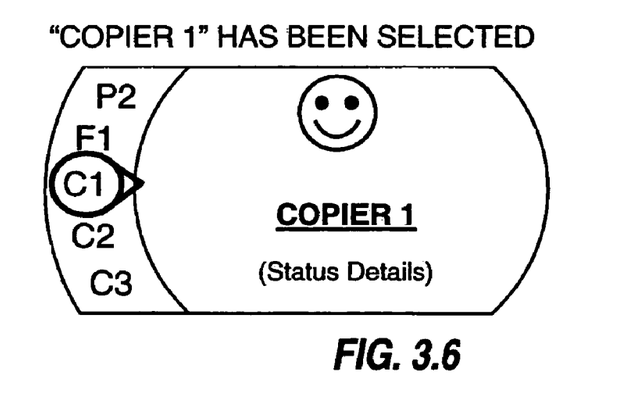

Turning the rotary ring 35 clockwise without activating switch 57 scrolls the array of icons in section 34 in the same direction, and vice versa. Preferably, the rotary ring 35 is provided with arresting positions in the form of "clicks", whereby each "click" corresponds to a next step in the scrolled array or list, i.e. one click selects the next graphical item in the loop 44. Turning the rotary ring 35 two "clicks" clockwise and selecting the graphical item assigned to copier 1, which is now located in the selection loop 44, brings the display from the state shown in FIG. 3.1. to the state as shown in FIG. 3.6.

Errors, such as paper jams, and other disturbances that need immediate attention are displayed with priority. Such events include paper jams, empty paper trays, low cooling liquid, full finishers, out of staples, toner empty, special insert needed, special paper needed, etc. These alerts are displayed immediately by showing a red and sad or even screaming smiley in display section 33, the specific expression being selected in dependence on the seriousness of the situation.

Some alerts that do not require immediate attention such a low toner or low paper level in paper trays, are displayed in section 33 with a lower priority expression. These alerts are only displayed if the operator is in the vicinity of the image processing device in question, and with a green neutral smiley signalling that attention is needed, but not immediately. When the alert becomes more serious, the smiley expression may be changed into a more alarming one.

Figure 37:
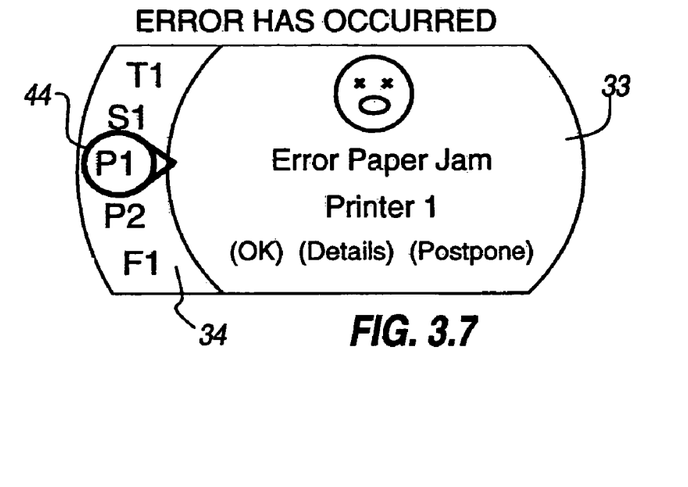

A paper jam is a serious error requiring immediate operator action. When, for example, a paper jam has occurred on printer 1, the display turns to the state as shown in FIG. 3.7, and in accordance with operator selectable settings, also an audible and/or vibration alarm is issued.

The upper part of section 33 now shows a sad and red smiley. Below the smiley, the text "Error: Paper jam" in large red letters is displayed. There below the text "Printer 1" is displayed. At the bottom of section 33 the selectable menu items "OK", "Details" and "Postpone" are displayed.

Figure 311:
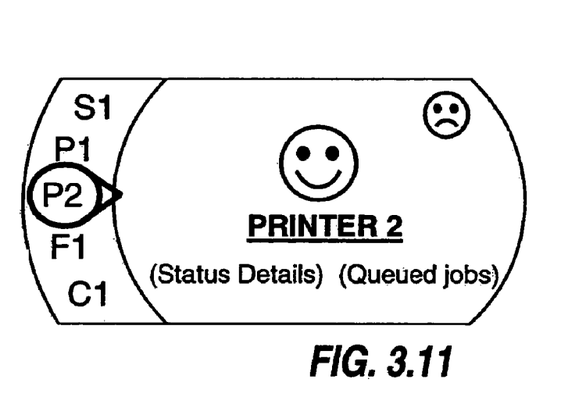

Selecting "OK" will acknowledge the alert and bring the display 32 to the state as shown in FIG. 3.11, in which the glyph is an unhappy smiley, but the error message has disappeared. The operator indicates by this selection that immediate repair action will be taken. Once the image processing device in question registers that the repair has been carried out it sends a signal to the portable terminal to turn to the status as in FIG. 3.1 with a happy smiley. The registration of the repair is part of the self check of the image processing device after all doors and covers are closed.

Figure 38:
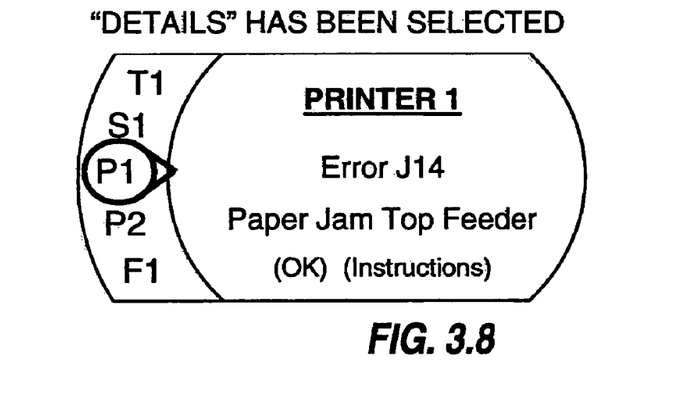

Selecting "Details" in the display shown in FIG. 3.7, brings the display to the state as shown in FIG. 3.8. Section 33 shows in the upper area the text "Printer 1". There below a detailed error message is shown, in the present example: "Error J14, paper jam top feeder". In the lower part of section 33 the selectable menu items "Instructions" and "OK" are displayed.

Figure 39:
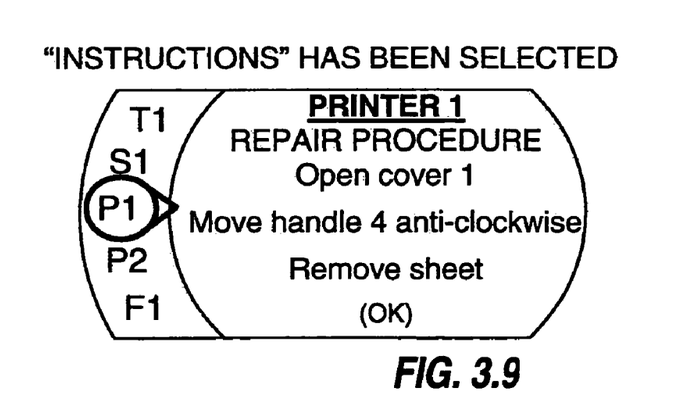
Figure 310:
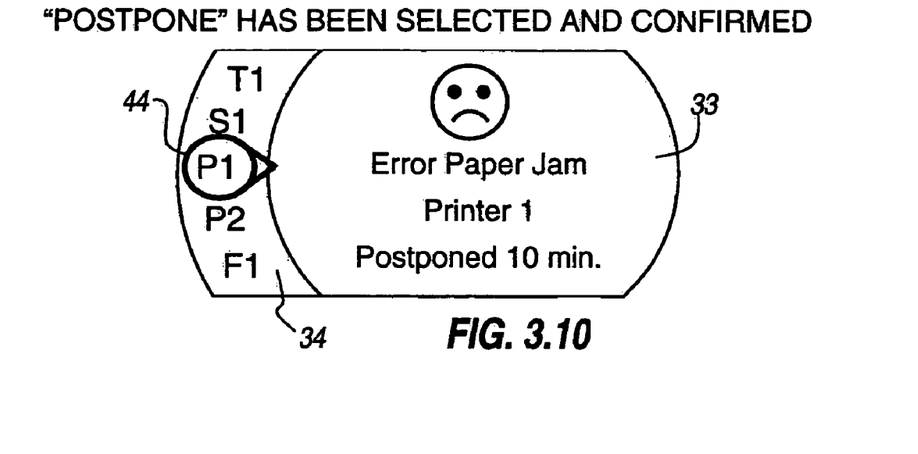

Selecting "instructions" brings the display to the state as shown in FIG. 3.9. The upper part of section 33 shows the text "printer 1". There below the steps needed to be taken to resolve the problem are listed in a scrollable list. In the present example, the list comprises "Open cover 1", "Move handle 4 anti-clockwise", "Remove stuck sheet" and "close cover 1". If the list of instructions is too long to be completely displayed on the display 32, it may be scrolled by turning the rotary ring 35. Informative pictures may also be shown on the display 32.

At the bottom part of display section 33 the selectable menu item "OK" is displayed, which when selected brings the display to the state as shown in FIG. 3.11, in which the portable terminal returns to its initial setting before the paper jam occurred, that is, the state shown in FIG. 3.2 reporting the status of printer 2. However, it also shows a red unhappy smiley icon in the upper right hand corner of the display section 33 as a warning that one of the other devices has an error and the terminal is waiting for a signal that the repair has been carried out, When "Postpone" is selected in the state of the display 32 as shown in FIG. 3.7, the display 32 turns to the state as shown in FIG. 3.10. The lower part of section 33 displays the confirmation message "Postponed 10 min", and the display will return to the state as shown in FIG. 3.11. After 10 minutes, or any other adjustable time period, the alert is repeated and the display will turn to the state shown in FIG. 3.7 again.

Figure 312:
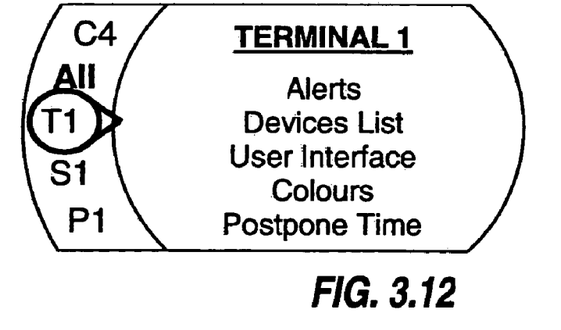

Selecting "T1", i.e. the portable terminal itself from the movable array of objects brings the display to the status as shown in FIG. 3.12. Section 33 shows a scrollable list of selectable menu items comprising, in this example, "Alerts", "Devices list", "User interface", "Colors", "Postpone time", "Language settings" and "Predetermined distance" (the last two items not shown). Scrolling the list with the rotary ring 35 highlights the selectable menu items one after another and pressing either the lower or upper button selects the highlighted menu item. The operation of carrying out changes to the settings is not shown here in detail and will be apparent to the skilled reader.

Figure 4:
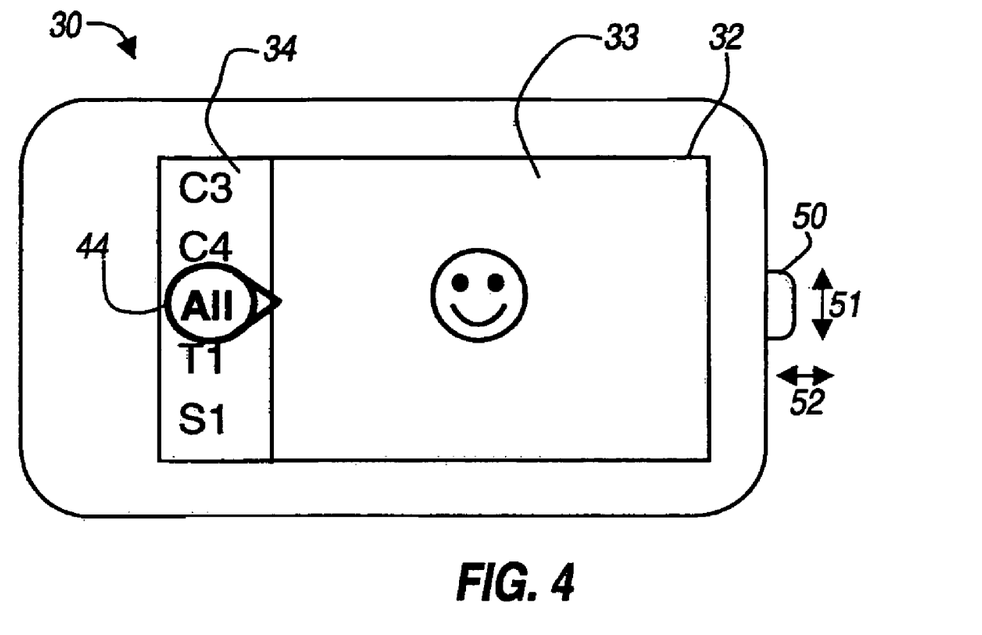
FIG. 4 is a second preferred embodiment of a portable terminal according to the present invention.

With reference to FIG. 4 an alternative embodiment of the portable terminal 30 is shown. The display 32 has been adapted to display in section 34 a straight array with objects representing the image processing devices in section 34. Section 33 displays general information, operating status information and selectable menu items.

The rotary ring 35 has been replaced by a slide switch 50. The slide switch 50 can be manipulated by the operator to slide upwards and downwards in the direction of the arrow 51. The slide switch 50 can be pressed in the direction of arrow 52 for selection purposes. The slide switch 50 is resiliently biased to take a neutral position in which it is in the middle of its translative range in the direction of arrow 51 and outwards at the end of its translative range in the direction of arrow 52. Section 33 of the display 32 is normally active, and sliding the slide switch 50 upwards results in the array of objects to scroll upwards and sliding the switch downwards results in the array to scroll downwards. Moving the slide switch 50 in the direction 51 while keeping it depressed results in scrolling through the image devices, and releasing the slide switch selects the device currently present in the selection loop 44. Section 33 then becomes active, and shows the status information as described further above. The software can be programmed such that one upward movement of the slide switch 50 moves the array of objects upwards by one object so that the next object in the array is placed in the selection loop 44.

The use of a display within which graphical icons are used instead of acronyms is shown in FIG. 5. The movable array thus comprises different graphical icons. A particular graphical icon is assigned to each type of image processing device, e.g. printers are assigned the icon that is generally used for this purpose in PC software; photocopiers are assigned a graphical icon resembling a photocopier, etc. The particular image processing device is further identified by a number displayed with the graphical icon. Also, status icons may be combined with the device icons to give the operator a first indication of the status of all devices shown on the display. Examples of such status icons are a red cross for unavailable devices, an hour glass for devices temporarily out of service.

When a new image processing device is added to the population of devices monitored with the aid of the portable terminal, its particulars are registered in the control program of the server 20 (FIG. 1) by a service engineer, or it may present itself to the server automatically. The server 20 then includes the new device in its status monitoring service and transmits installation data to the portable terminal 30, such that it may register the new device and add it to the list of devices in display section 34 and related monitoring service.

Also, when an image processing device is removed from the population of devices, it is deleted from the monitoring service in the server 20. In that case, the server 20 sends a signal to the portable terminal 30 to delete the device from its display and service.

In the description above, the monitoring service is for the greater part implemented in the server 20 (FIG. 1), and the portable terminal simply operates as a user interface to the monitoring service in the server 20. Such an implementation has the advantage that data traffic between the server 20 and the portable terminal 30 is minimized.

However, it would also be possible to implement the monitoring service in the portable terminal and use the server 20 only for collecting status data of the monitored devices.

It would also be possible to do without the server 20 and include a wireless transmitter into each of the devices. The devices would then themselves send their status data to the portable terminal, which would include a monitoring service for processing the status data of the devices. In this case, the control program of the portable terminal is also provided with a registering service to register all devices to be monitored.

While the preferred embodiments of the devices and methods have been described in reference to the environment in which they were developed, they are merely illustrative of the principles of the invention. Other embodiments and configurations may be devised without departing from the scope of the appended claims.

What is claimed is:

1. A portable terminal for presenting information regarding a plurality of devices in a proximate environment, said portable terminal having
   a digital processor and related memory,
   an operator movable operating element,
   a display for selectively displaying information data of a selected one of said devices, and
   means for selecting any one of said devices comprising:
   an array of display objects representing individual devices, said array being at least partially displayed on said display,
   and a marker displayed on said display, said array and said marker being movable relative to one another,
   wherein the movement of the movable operating element by an operator results in a substantially coincident movement of said array of marker and
   said movable operating element is positioned so that it appears to an operator to at least partially overlap with the display such that said array or said marker appears to an operator to be an integral part of the operating element and that the array and the movable operating element appear to either rotate about the same axis or move parallel to one another.

2. The portable terminal according to claim 1, wherein the movable, operating element is positioned underneath the display, and wherein the array or marker moves in unison with the movable operating element.

3. The portable terminal according to claim 1, wherein the movable operating element is positioned at a side of the display, and wherein the array or marker is adapted to move in unison with the movable operating element.

4. The portable terminal according to claim 1, wherein the movable element is a slide switch and the array is substantially linear in its display.

5. The portable terminal according to claim 1, wherein the movable element is a rotary ring and the array is circular or at least arc shaped in its display.

6. The portable terminal according to claim 2, wherein the movable, operating element is provided with a number of arresting positions, and position of one of one of the objects of said array is adapted coincides with said marker at one of said arresting positions.

7. The portable terminal according to claim 5, wherein said rotary ring is a thumbwheel which protrudes from at least one side surface of the portable terminal.

8. The portable terminal according to claim 2, wherein the movement of the movable operating element in a first state of the portable terminal is adapted to scrolls the array of objects, and the movement of the movable operating element in a second state of the portable terminal is adapted scrolls an array of menu items.

9. The portable terminal according to claim 8, wherein said movable operating element is positioned to allow the actuation of a switch, through the application of pressure, on the movable operating element for controlling menu options.

10. The portable terminal according to claim 9, wherein the movable operating element is made of flexible material so as to allow actuation of an internal switch.

11. The portable terminal according to claim 9, wherein the suspension of the movable operating element allows the latter to make translative movements for actuating a switch.

12. The portable terminal according to claim 1, further comprising a transceiver for receiving a wireless signal incorporating said information.

13. The portable terminal according to claim 1, wherein said information includes operational status data for each of said devices.

14. The portable terminal according to claim 1, further comprising means for producing an audible signal.

15. A system for controlling the operational status of a plurality of image processing devices which comprises:
   a network for receiving the operational status information of said plurality of image processing devices;
   a server and transmitter for receiving the operational status information from the network; and
   a portable terminal as defined in claim 1, for receiving the operational status information for presentation to an operator.

16. The portable terminal of claim 1, wherein the movable operating element further comprises a wheel to pick up angular movements.

17. The portable terminal of claim 1, further comprising a switch adjacent the movable operating clement and wherein the movable operating element contains an opening to permit it to be moved into contact with the switch.

18. A portable terminal for presenting information regarding a plurality of devices in a proximate environment, said portable terminal having
   a digital processor and related memory.
   a mechanically movable operating element,
   a display for selectively displaying information data of a selected one of said devices, and
   means for selecting any one of said devices comprising:
   an array of display objects representing individual devices, said array being at least partially displayed on said display,
   and a marker displayed on said display, said array and said marker being movable relative to one another,
   wherein a movement of the mechanically movable operating element by an operator in a given direction results in a substantially coincident movement of said array or marker in the given direction, and
   said movable operating element is disposed below the display in a partially overlapping position therewith, and the displayed array and the displayed marker are positioned on the display in such a way that one of them moves in unison with the movable operating element so as to appear to an observer of the display as if it is an integral part of the movable operating element and that the array and the movable operating element appear to either rotate about the same axis or parallel to one another.

19. The portable terminal of claim 1, wherein the operator movable operating clement is a tangible element.

20. A portable terminal for presenting information regarding a plurality of devices in a proximate environment, said portable terminal comprising:
   a digital processor and related memory;
   a mechanically movable rotatable ring having a fixed radius of curvature;
   a display for selectively displaying information data of a selected one of said devices, wherein the display provides an arc shaped arrangement of display objects, the diameter of the arc being substantially the same radius of curvature as that of the movable rotating ring, and the array of display objects represents a number of individual ones of said plurality of devices; and a marker displayed on said display, said array and said marker being movable relative to one another by rotating the rotatable ring, wherein a movement of the mechanically movable rotatable ring by an operator in a given direction results in a substantially coincident movement of the display objects on said arc-shaped display with respect to said marker in the given direction, so that the arc shaped arrangement of display objects appears to an observer of the display as if it is an integral part of the mechanically movable rotatable ring and that the array and the movable operating element appear to rotate about the same axis.

* * * * *